Oct. 13, 1959   S. P. DI MATTIA ET AL   2,908,294
SURGE PRESSURE ABSORBER
Original Filed Sept. 1, 1953
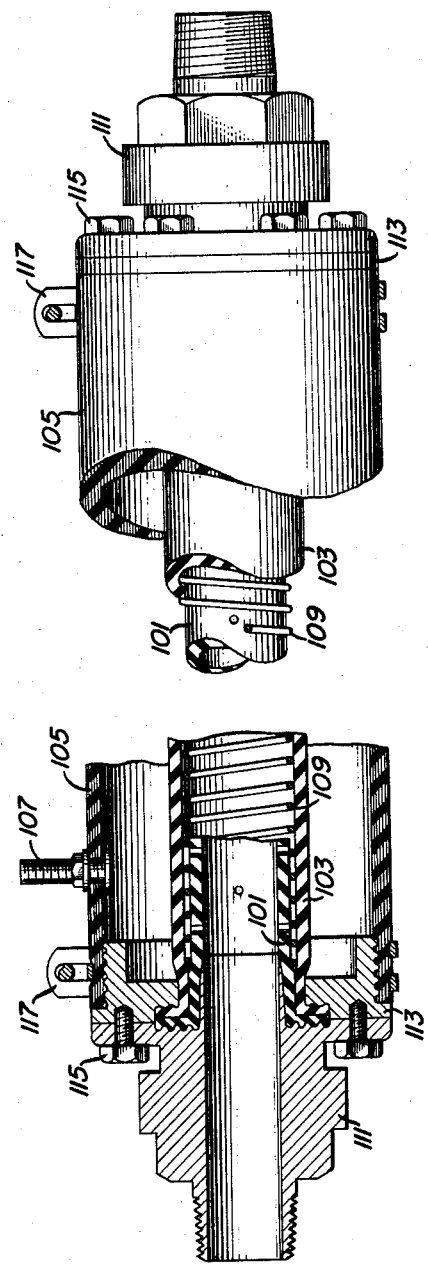
INVENTOR
Samuel P. DiMattia
John N. Bruce
BY George Renehan
ATTORNEY

United States Patent Office 2,908,294
Patented Oct. 13, 1959

2,908,294

SURGE PRESSURE ABSORBER

Samuel P. Di Mattia, New Castle, Del., and John N. Bruce, Bel Air, Md., assignors to the United States of America as represented by the Secretary of the Army Original application September 1, 1953, Serial No. 377,987, now Patent No. 2,838,073, dated June 10, 1958. Divided and this application November 19, 1956, Serial No. 626,793

3 Claims. (Cl. 138—30)

(Granted under Title 35, U.S. Code (1952), sec. 266)

The invention described herein may be manufactured and used by or for the Government of the United States of America for governmental purposes without the payment to us of any royalty thereon. This application is a division of application S.N. 377,987, filed September 1, 1953, now Patent 2,838,073, granted June 10, 1958.

This invention relates to a surge pressure absorber which is adapted to absorb or reduce the surge pressure or "liquid hammer" caused by the stoppage of the flow of liquid.

An object of our invention is to provide a surge pressure absorber which will offer a minimum of resistance to the flow of fluid therethrough.

A more specific object of our invention is to provide a surge pressure absorber which is adapted to handle highly viscous liquids under high pressures flowing at high velocities.

A still more specific object of our invention is to provide a surge pressure absorber which is suitable for use in the extension hose of a military flame thrower of the type employing jellied gasoline as a fuel.

A further object of our invention is to provide a surge pressure absorber which is simple in construction and light in weight.

A further object of certain embodiments of our invention is to provide a surge pressure absorber which is flexible.

The figure shows a surge chamber in accordance with our invention partially in elevation and partially in section.

When the flow of liquid in a long pipe or other conduit is suddenly arrested the kinetic energy of the moving mass of liquid gives rise to high momentary increases in pressures and sets up compressional waves in the column of liquid. Various means have been proposed to provide a cushion for the fluid which will lessen the rate of deceleration of the liquid and hence the force imposed on the conduit, or damp the compressional waves. It is to this class of device that our invention relates.

Basically, it comprises two concentric tubes of differing diameter, the ends of which are connected in such a manner as to provide a sealed air space between the tubes. The inner tube is made of an elastic, expansible material, such as non-reinforced rubber. The outer tube is formed of relatively strong material having substantially fixed dimensions. This outer tube is made of a flexible material such as reinforced rubber. A short section of conventional fire hose is suitable. The elastic inner tube is supported against collapse by a third flexible tube which is perforated and located within the elastic tube. A spring between these two last named tubes serves the dual purpose of preventing collapse and at the same time providing flexibility.

Flame throwers of the type employing jellied gasoline fuel presented particularly difficult problems due to surge pressures. Normal operating pressures are extremely high, being of the order of several hundred pounds per square inch, velocities are high and the flow is suddenly interrupted. The peculiar physical properties of the jellied gasoline make it imperative to avoid obstructions to or deflection of the flow. It is also necessary to keep the weight to a minimum and to employ a structure which can readily be disassembled for replacement or repair of parts. Commercial surge chambers available at the time this invention was made were not adaptable to this use because of failure to meet the requirements set out above.

The specific embodiment of our invention will now be described.

The device described and claimed in this application corresponds to that of Figure 7 of our parent application identified above. It combines the advantages of flexibility, possessed by the embodiment of Figure 1 of our patent with the use of gas under pressure in the surge chamber as shown and described in connection with Figures 5 and 6 of our patent. The use of the innermost perforated flexible tube and the spring between this tube and the elastic tube prevent collapse of the latter due to air pressure.

In this modification two flexible tubes 101 and 103 are provided. The inner tubular member 101 is perforated in the same manner and for the same purpose as tubular member 55 of Figures 5 and 6 of our patent identified above. This tubular member may be made of either reinforced or non-reinforced rubber. The outer tube 103 is made of non-reinforced rubber and constitutes an expansible member similar to the corresponding tube of each of the other modifications described in our patent. A reinforced hose 105 forms the outer wall of the absorber and may be provided with a conventional self closing valve 107.

Between tubes 101 and 103 we provide a spring stiffener 109. While we have shown the tubes as separated throughout most of their length by the thickness of the spring wires, it will be understood that under high pressures in tubular member 101 and outside of tube 103, the tubes will be pressed together between the wires, providing mutual support. The structure is completed by flanged sleeve 111, wall member 113, cap screws 115 and hose clamp 117 at each end of the device which join the elements previously described in a manner which will be apparent from the drawing.

The inside diameter of tube 101 and sleeve 111 are the same as that of the line in which the absorber is to be mounted. When connected to the liquid line the surge pressure absorber becomes an integral part of the line and does not interrupt or change the flow of the liquid. Further, due to the absence of obstructions of any kind no turbulence is introduced and the velocity of flow is not affected until a flow stop is made by valve closure. On such closure the liquid flows through the perforations in tube 101, expanding tube 103 against the gas pressure within tube 105. The pressure within tube 105 may be suitably controlled to give the best results for the particular installation.

While we have given numerous details of construction it will be realized that they are merely exemplary and that numerous variations are possible. We, therefore, do not wish our invention to be limited except by the scope of the appended claims.

We claim:

1. A surge pressure absorber comprising a flexible tubular member having a central perforate portion, a coil spring surrounding and in contact with said tubular member, a resilient expansible tube surrounding and in contact with said coil spring, a flexible wall member of substantially fixed dimensions surrounding and spaced from said tube, means joining said tubular member, said tube, and said wall member in such a manner as to form a substantially liquid and gas tight space between said tube and said wall member, and coupling means at each end of said tubular member having a bore of substantially the same diameter as said tubular member and adapted to connect said absorber to a conduit of substantially the same diameter.

2. A device as defined in claim 1 further comprising means to introduce and maintain gas under pressure within said space.

3. A device as defined in claim 1 wherein said tubular member is formed of rubber, said tube is formed of resilient non-reinforced rubber, and said wall member is a reinforced rubber hose.

References Cited in the file of this patent

UNITED STATES PATENTS

| | | |
|---|---|---|
| 325,591 | Coultaus | Sept. 1, 1885 |
| 2,261,948 | Beach | Nov. 11, 1941 |
| 2,583,231 | Ragland | Jan. 22, 1952 |
| 2,712,831 | Day | July 12, 1955 |

FOREIGN PATENTS

| | | |
|---|---|---|
| 17,403 | Great Britain | Aug. 6, 1896 |

UNITED STATES PATENT OFFICE

CERTIFICATE OF CORRECTION

Patent No. 2,908,294                                  October 13, 1959

Samuel P. Di Mattia et al.

It is hereby certified that error appears in the above numbered patent requiring correction and that the said Letters Patent should read as corrected below.

In the grant, lines 1, 2, 3 and 4, for "Samuel P. Di Mattia, of New Castle, Delaware, and John N. Bruce, of Bel Air, Maryland, assignors to the United States of America as represented by the Secretary of the Army," read -- Samuel P. Di Mattia, of New Castle, Delaware, and John N. Bruce, of Bel Air, Maryland, --; lines 13 and 14, for "United States of America as represented by the Secretary of the Army" read -- Samuel P. Di Mattia and John N. Bruce, their heirs or assigns --; in the heading to the printed specification, lines 3, 4 and 5, for "Samuel P. Di Mattia, New Castle, Del., and John N. Bruce, Bel Air, Md., assignors to the United States of America as represented by the Secretary of the Army" read -- Samuel P. Di Mattia, New Castle, Del., and John N. Bruce, Bel Air, Md. --.

Signed and sealed this 26th day of April 1960.

(SEAL)
Attest:

KARL H. AXLINE                                                      ROBERT C. WATSON
Attesting Officer                                         Commissioner of Patents